United States Patent
Bellantoni et al.

(10) Patent No.: US 7,539,639 B2
(45) Date of Patent: May 26, 2009

(54) EXCHANGE OF INFORMATION

(75) Inventors: Ray R. Bellantoni, Campbell, CA (US); Krishnan Raghuram, San Jose, CA (US); Howard Cooper, Tekoa (IL); Sandeep Kundra, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 1536 days.

(21) Appl. No.: 09/978,532

(22) Filed: Oct. 15, 2001

(65) Prior Publication Data

US 2003/0074208 A1   Apr. 17, 2003

(51) Int. Cl.
*G06Q 40/00*   (2006.01)

(52) U.S. Cl. .............................. 705/37; 705/38; 705/36; 705/35

(58) Field of Classification Search .................... 435/68, 435/70; 705/1, 35–38
See application file for complete search history.

(56) References Cited

U.S. PATENT DOCUMENTS

2001/0047276 A1* 11/2001 Eisenhart ....................... 705/1

OTHER PUBLICATIONS

TD Bank cuts off Skeena; operations closed unless a buyer steps in Paul Willcocks. Sterling News Service. British Columbia: Sep. 5, 2001. p. 1.*
"Enterprise Solutions", http://www.hellobrain.com/corporate/enterprise.asp, (1999-2001), 1 pg.
"Enterprise Solutions", http://www.hellobrain.com/corporate/c3procure.asp, (1999-2001), 1 pg.
"Enterprise Solutions", http://www.hellobrain.com/corporate/c3engage.asp, (1999-2001), 1 pg.
"Projected Details", http://www.hellobrain.com/prob/showdetails/asp?pid=04760348310663911003, (1999-2001), 1 pg.
"Search Projects", http://www.hellobrain.com/search/prjschlst.asp, (1999-2001), 1 pg.
"Solutions Overview", http://www.hellobrain.com/corporate/solutions.asp, (1999-2001), 1 pg.

* cited by examiner

*Primary Examiner*—Frantzy Poinvil
*Assistant Examiner*—Clement Graham
(74) *Attorney, Agent, or Firm*—Schwegman, Lundberg & Woessner, P.A.

(57) ABSTRACT

A method, apparatus, and signal-bearing medium for allowing participants to exchange information regarding a program. The program may be a joint-development program in which the participants are participating, and the information may be confidential information regarding the program that belongs to the respective participants.

21 Claims, 11 Drawing Sheets

200

| Address | | |
|---|---|---|
| *Street Address 1 | 505 Montgomery | 205 |
| Street Address 2 | | |
| *City | San Francisco | |
| State in USA | California ▼ | |
| *Phone | 415 887-3300 | |
| Fax | | |
| Username | applicant@devcityrock | |
| *CNDA Number | 19939444 | 210 |

OK  CANCEL

FIG. 2

Use this page to control access to your company's documents.

Access properties for program category: [Program 1 ▼] 405

Companies Requesting Access 410

| Company Name | Approve | Deny | Information Request Status | Request More Information |
|---|---|---|---|---|
| M Company | ○ | ○ | Requested | Create Message |

Companies Granted Access 415

| Company | Revoke |
|---|---|
| C Company | ☐ |
| D Company | ☐ |

Companies Denied Access
These companies have been denied access to the program selected above.
To change this, check Approve.

M Company 420

| Company | Approve |
|---|---|
| M Company | ☐ |

FIG. 4

Field Activity View

SRM Options
- View Accounts

Member Options
- My Company Information
- Add to My Company's Files
- Request Access to Another Company's Files
  - Check Request Status

Help
- User Guide
- Log Off
- Terms and Conditions
- Authorized Disclosure Letter

Account Information

| Company | Status | Welcome | Info | Access |
|---|---|---|---|---|
| Company A | Not Participant | | | |
| Company B | Not Participant | | | |
| Company C | Not Participant | | | |
| Company D | Participant | Go | Go | Go |
| Company E | Not Participant | | | |
| Company F | Not Participant | | | |

FIG. 5

Request Access

- Participants may request access to the information other companies provide through a simple click and e-mail format Developer Exchange:
Request Access Your company is currently participating in an exchange with the companies checked below. To request access from an additional company, check the name of that company and click on the Request Access button. An e-mail confirming submission of the request for access is then transmitted to the company contact. Any subsequent changes in your access status will be reflected on the site and will be communicated to you via e-mail.

ABCDEFGHIJKLMNOPQRSTUVWXYZ

- ☑ A Company 1
- ☐ A Company 2
- ☐ D Company
- ☐ L Company 1
- ☐ L Company 2
- ☐ M Company

[ Request Access ]

[back to top]

FIG. 7

Company Information

Contacts for Company Name 3  /805

| Name | EMail Address | Phone Number |
|---|---|---|
| Employee Name | Employee@companyname3.com | 408 765-4730 |

Available Files:
The following files were added by members from Company Name 3
Scroll down to see files listed in another program or programs.

Program Files  /810

| Title | Description | Date Added |
|---|---|---|
| New Product Info | Information on our not-yet released products | 11/02/2000 |

View

FIG. 8

My Company Information

On this page you can:
- View the current list of participants (contacts) within My Company
- View, delete or update files already uploaded

Contacts:

| Name | EMail Address | Phone Number |
|---|---|---|
| Contact Name 1 | contact1@companyname3.com | N/A |
| Contact Name 2 | contact2@companyname3.com | 408-765-4730 |

Available Downloads:
The following files have been uploaded by participants from My Company

Program Files

| Title | Description | Added |
|---|---|---|
| Program File 1 | Program File 1 Brief Description | 09/06/2000 View \| Delete \| Update |
| Program File 2 | Program File 2 Brief Description | 09/29/2000 View \| Delete \| Update |

FIG. 9

EXCHANGE OF INFORMATION

FIELD

This invention relates generally to computers and more particularly to managing a controlled-communication program between multiple participants using computers.

BACKGROUND

Companies often work together on joint projects or programs to develop products. Each company may have confidential information that it needs to share in order to achieve the goals of the program. This confidential information may include data about new technology, product plans, customer lists, or any other information that gives a company a competitive advantage. The companies are concerned that their confidential information should only be used to achieve the program goals and should not be distributed to others not working on the program. To address these concerns, companies often sign contracts, called non-disclosure agreements that specify the terms and conditions under which they will disclose and receive confidential information to and from each other and the steps they will take to prevent disclosure of the confidential information to third parties who are not participants in the program. A participant may be a company, an employee of the company, a contractor affiliated with the company, an individual, or any other suitable entity.

Because products are often large and complicated, often many participants may be involved. When multiple participants are working together on a program, to initiate a discussion, one participant must ask another participant to show evidence of their contract, indicating that they are authorized to discuss the program and exchange information. Since a company might have dozens or even hundreds of employees working on the program, not everyone may have a copy of the contract, and there may be confusion about its existence.

BRIEF DESCRIPTION OF THE DRAWINGS

FIG. 2 depicts a block diagram of a user interface log-in screen, according to an embodiment of the invention.

FIG. 4 depicts a block diagram of a user interface access-control screen, according to an embodiment of the invention.

FIG. 5 depicts a block diagram of a user interface field-activity screen, according to an embodiment of the invention.

FIG. 7 depicts a block diagram of a user interface request-access screen, according to an embodiment of the invention.

FIG. 8 depicts a block diagram of a user interface company-information screen, according to an embodiment of the invention.

FIG. 9 depicts a block diagram of a user interface my-company-information screen, according to an embodiment of the invention.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
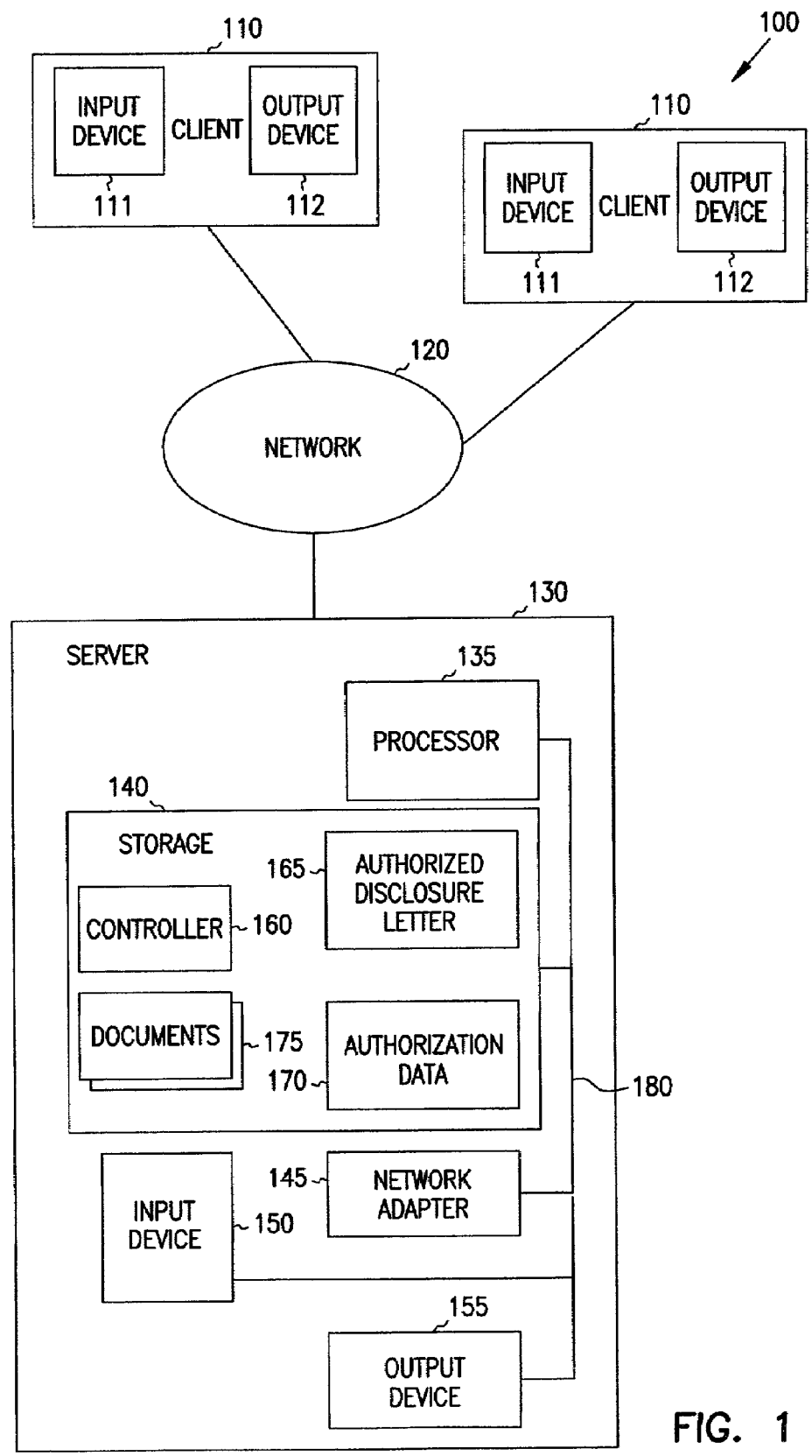
FIG. 1 depicts a block diagram of a network of computers for implementing an embodiment of the invention.

FIG. 1 depicts a block diagram of system 100, which may include a network of computers for implementing an embodiment of the invention.

System 100 includes clients 110, network 120, and server 130. According to this embodiment, in system 100, server 130 provides clients 110 with the ability to exchange confidential information about a controlled-communication program via network 120. In one embodiment, a controlled-communication program may be a joint-development program in which multiple participants (such as individuals, companies, or other entities) share confidential information in order to develop a product or service. But, in other embodiments, a controlled-communication program may be any program in which participants achieve the program goals by communicating information in a controlled fashion.

Clients 110 may be implemented using any suitable hardware and/or software, such as personal computers available from a number of vendors. But, other examples may be portable computers, network computers, laptop or notebook computers, PDAs (Personal Digital Assistants), mainframe computers, or any other suitable computing devices. Although two clients 110 are shown, in other embodiments any number of clients may be present. Client 110 may include input device 111, enabling a user of client 110 to input data to be sent data to server 130, and output device 112, enabling a user of client 110 to receive data.

Network 120 may be any suitable network capable of supporting communication between clients 110 and server 130. Although one network 120 is shown, in other embodiments any number of networks may be present and clients 110 may use the same network or different networks. In an embodiment, network 120 may support wireless communications. In another embodiment, network 120 may support hard-wired communications, such as a telephone line or cable. In an embodiment network, 120 may be the Internet and supports IP (Internet Protocol). In other embodiments, network 120 may be a local area network (LAN) or a wide area network (WAN). In still other embodiments, network 120 may support any appropriate protocol.

Server 130 may include processor 135, storage device 140, network adapter 145, input device 150, and output device 155, all communicatively coupled via bus 180. Processor 135 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 135 executes instructions and includes that portion of server 130 that controls the operation of the entire server. Although not depicted in FIG. 1, processor 135 typically includes a control unit that organizes data and program storage in computer memory and transfers data and other information between the various parts of server 130. Processor 135 may receive input data from input device 150 and network adapter 145, read and store code and data in storage device 140, and may present output data to a user via output device 155. Processor 135 also may transmit and receive packets of information across network 120 using network adapter 145.

Although server 130 is shown to contain only a single processor and a single bus, the present invention applies equally to servers that may have multiple processors and to servers that may have multiple buses with some or all performing different functions in different ways.

Storage device 140 represents one or more mechanisms for storing data. For example, storage device 140 may include read only memory (ROM), random access memory (RAM), magnetic disk storage media, optical storage media, flash memory devices, and/or other machine-readable media. Although only one storage device 140 is shown, multiple storage devices and multiple types of storage devices may be present. Further, although server 130 is drawn to contain storage device 140, it may be distributed across other servers.

Storage device 140 may include controller 160, authorized disclosure letter 165, authorization data 170, and documents 175. Controller 160 may include instructions capable of being executed on processor 135 to carry out the functions of the present invention. In another embodiment, some or all of the functions of the present invention may be carried out via hardware in lieu of a processor-based system. Of course, storage device 140 may also contain additional software and data (not shown), which is not necessary to understanding the invention.

Authorized disclosure letter 165 contains the terms and conditions under which companies and individuals disclose the information in documents 175 to each other. Authorized disclosure letter 165 is further described below with reference to FIG. 3.

Authorization data 170 may contain security information regarding which companies and which individuals are authorized to view which portions of documents 175. Authorization data 170 is further described below with reference to FIGS. 10 and 11.

Documents 175 may contain information, including confidential information, that a participant in a program wishes to share with other participants involved in the same program. Although documents 175 is drawn as including two entities, in other embodiments there may be any number of documents organized by program and/or by company. Documents 175 is further described below with reference to FIG. 4. Although documents 175 is drawn as being contained within server 130, in other embodiments some or all of documents 175 may be distributed across other servers attached to network 120 or may be included within clients 110.

Bus 180 may represent one or more busses (e.g., PCI, ISA (Industry Standard Architecture), X-Bus, EISA (Extended Industry Standard Architecture), or any other appropriate bus and bridges (also called bus controllers).

Network adapter 145 facilitates communication between server 130 and network 120. Network adapter 145 provides server 130 with a means of electronically communicating information with a remote computer, such as client 110. In addition, in another embodiment, network adapter 145 may support distributed processing, which enables server 130 to share a task with other devices linked to network 120. Although network adapter 145 is shown as part of server 130, in another embodiment they may be packaged separately. Although only one network adapter 145 is shown, in other embodiments multiple network adapters of the same or of a variety of types may be present.

Input device 150 is that part of server 130 that accepts input from a user. In an embodiment, input device 150 may be a keyboard, but in other embodiments, input device 150 may be a pointing device, mouse, trackball, keypad, touchpad, touch screen, pointing stick, microphone, or any other appropriate input device. Although only one input device 150 is shown, in other embodiments any number of input devices of the same or of a variety of types may be present. In another embodiment, input device 150 may not be present.

Output device 155 communicates information to the user of server 130. Output device 155 may be a cathode-ray tube (CRT) based video display well known in the art of computer hardware. But, in other embodiments output device 155 may be replaced with a liquid crystal display (LCD) based or gas, plasma-based, flat-panel display. In still other embodiments, any appropriate display device may be used. In yet other embodiments, a speaker that produces audio output may be used. Although only one output device 155 is shown, in other embodiments, any number of output devices of different types or of the same type may be present. In other embodiments, output device 155 might not be present.

Server 130 may be implemented using any suitable hardware and/or software, such as a personal computer or other electronic computing device. Portable computers, laptop or notebook computers, and mainframe computers are examples of other possible configurations of server 130. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports communicating information to clients.

As will be described in detail below, aspects of an embodiment pertain to specific apparatus and method elements implementable on servers. In another embodiment, the invention may be implemented as a program product for use with a server. The programs defining the functions of this embodiment may be delivered to a server via a variety of signal-bearing media, which include, but are not limited to:

(1) information permanently stored on a non-rewriteable storage medium (e.g., read-only memory devices attached to or within a server, such as a CD-ROM readable by a CD-ROM drive);

(2) alterable information stored on a rewriteable storage medium (e.g., a hard disk drive or diskette); or (3) information conveyed to a server by a communications medium, such as through a computer or telephone network accessed via network adapter 145, including wireless communications.

Such signal-bearing media, when carrying processor-readable instructions that direct the functions of the present invention, represent embodiments of the present invention.

FIG. 2 depicts a block diagram of user interface log-in screen 200, which may be created by server 130, sent to client 110 via network 120, and displayed at client 110 via output device 112. A user at client 110 may enter data into the fields of log-in screen 200 via input device 111. User interface log-in screen 200 may include user identification data fields 205 and non-disclosure agreement number field 210. User identification data field 205 identifies the user who is requesting access, and non-disclosure agreement number 210 identifies a contract that was previously signed between the user (or the user's employer or affiliated company) and the company that controls or administers server 130.

Figure 3:
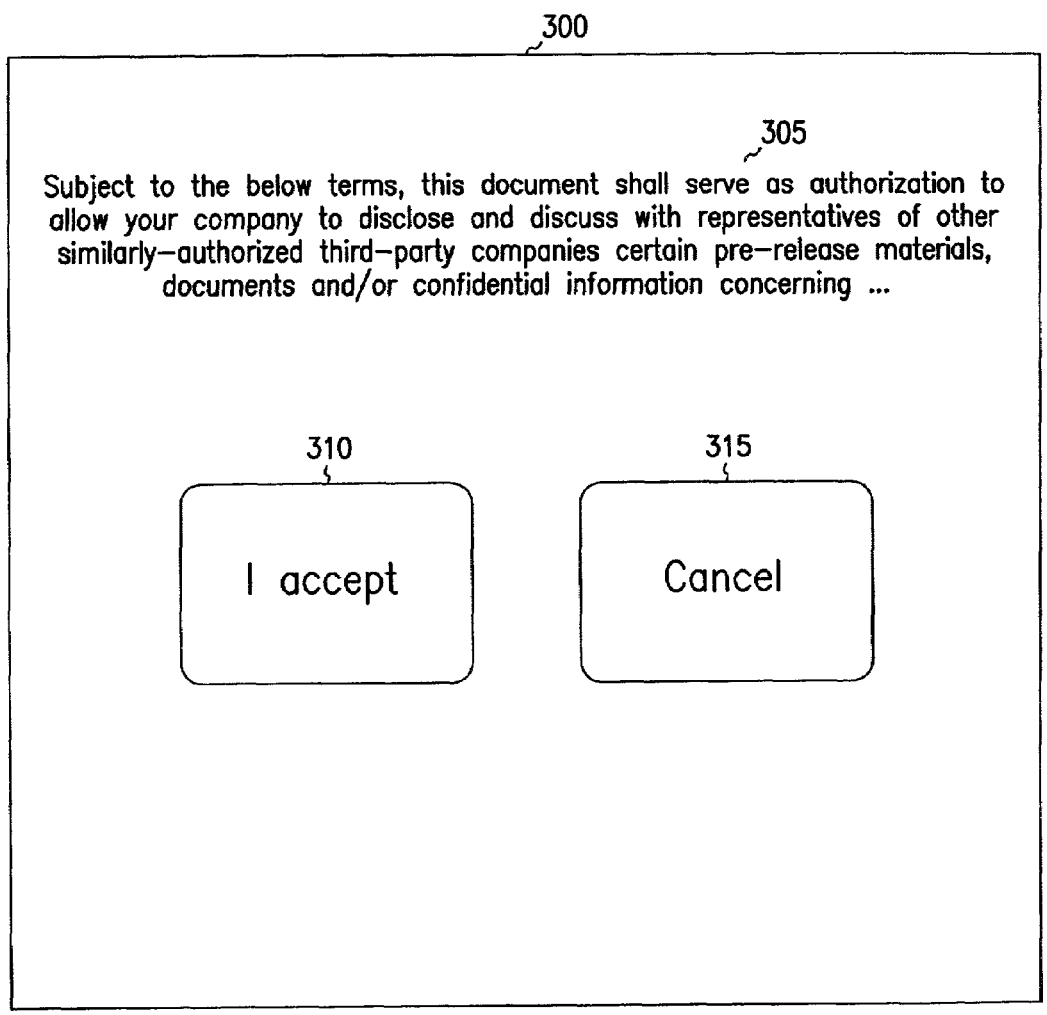
FIG. 3 depicts a block diagram of a user interface contract-acceptance screen, according to an embodiment of the invention.

FIG. 3 depicts a block diagram of user interface contract-acceptance screen 300, according to an embodiment of the invention. Contract-acceptance screen 300 may be created by server 130, sent to client 110 via network 120, and displayed at client 110. Contract-acceptance screen 300 includes contract language 305 from authorized-disclosure letter 165, acceptance button 310, and cancel button 315. After reading contract language 305, the user may accept the terms and conditions of contract language 305 by selecting acceptance button 310 or may decline the contract by selecting cancel button 315.

FIG. 4 depicts a block diagram of user interface access-control screen 400, according to an embodiment of the invention. Access-control screen 400 may be created by server 130, sent to client 110 via network 120, and displayed at client 110. Access-control screen 400 may be manipulated by a participant to control access by others to the participant's documents, such as documents 175. Program field 405 allows the participant to select the applicable program. Companies requesting access 410 allows the participant to approve or deny access requests from other companies. Companies granted access 415 displays those companies that were previously granted access and allows the participant to revoke access. Companies denied access 420 displays those companies who have previously been denied access to documents 175 and provides the participant with an opportunity to approve access.

FIG. 5 depicts a block diagram of user interface field-activity screen 500, according to an embodiment of the invention. Field-activity screen 500 may be created by server 130, sent to client 110 via network 120, and displayed at client 110. Field-activity screen 500 may be used by a representative, such as a field representative, of the company associated with server 130 to display which companies are participating in the exchange of documents 175.

Figure 6:
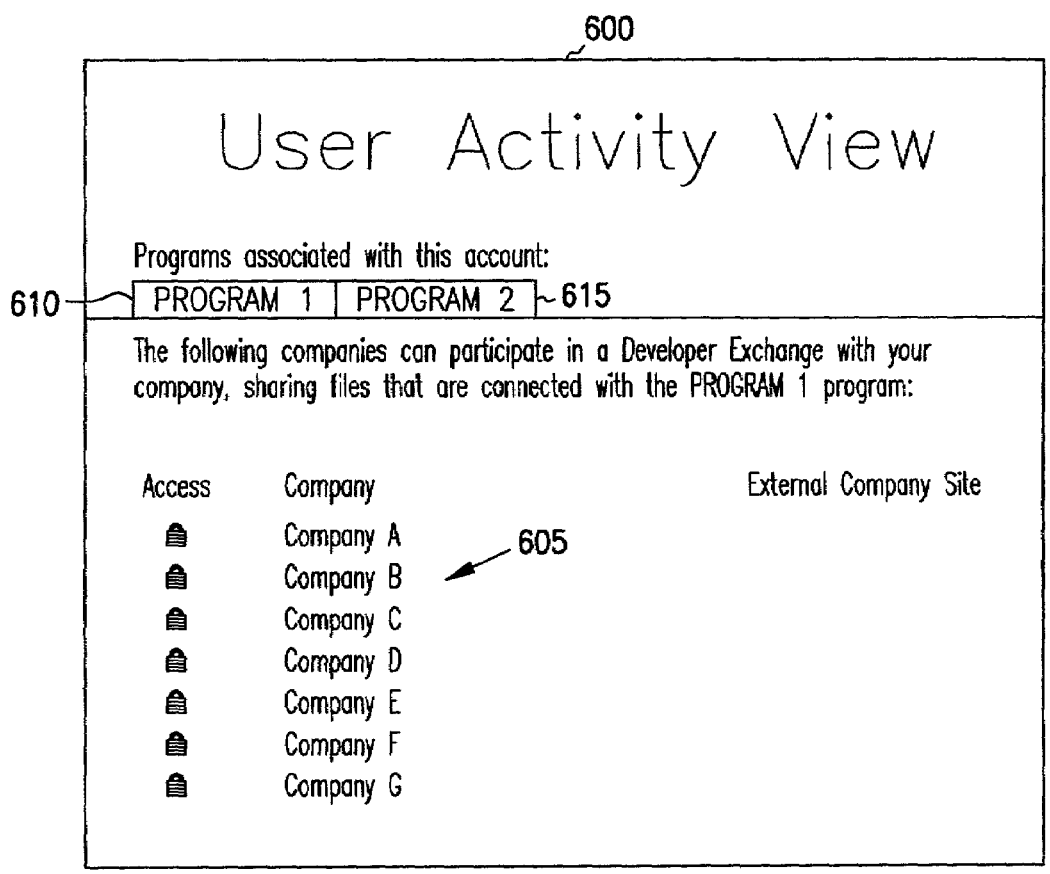
FIG. 6 depicts a block diagram of a user interface user-activity screen, according to an embodiment of the invention.

FIG. 6 depicts a block diagram of user interface user-activity screen 600, according to an embodiment of the invention. User-activity screen 600 may be created by server 130, sent to client 110 via network 120, and displayed at client 110. User-activity screen 600 may be used by a participant to display list-of-companies 605, which are companies that may participate in the exchange of documents 175 with the participant. Although seven companies are shown, any number may be present, corresponding to the number of companies that are authorized to exchange documents 175 with the participant with respect to the selected program. The companies may be displayed on a per-program basis, and the participant may select the desired program using tabs 610 and 615. Although two tabs 610 and 615 are shown, any number of tabs may be present corresponding to the programs for which that the participant is authorized. Server 130 generates list-of-companies 605 from authorization data 170.

FIG. 7 depicts a block diagram of user interface request-access screen 700, according to an embodiment of the invention. Request-access screen 700 may be created by server 130, sent to client 110 via network 120, and displayed at client 110. Request-access screen 700 may be used by a user to request access to documents 175 on a per-company basis. Request-access screen 700 includes list-of-companies 705, which includes both companies for which the user is already authorized and companies for which the user may request access. Although six companies are shown in list-of-companies 705, any number may be present, and none, some, or all of them may be checked as having approved access to documents 175. The user may request access from an additional company by checking the name of the company and selecting request-access button 710. Although the user interface elements of check boxes and selection buttons are shown, in other embodiments any suitable user interface elements may be provided.

FIG. 8 depicts a block diagram of user interface company-information screen 800, according to an embodiment of the invention. Company-information screen 800 may be created by server 130, sent to client 110 via network 120, and displayed at client 110. Company-information screen 800 may display contact information 805 for companies who are participating in programs with the user. Company-information screen 800 may also display file information 810, which contains information about the files within documents 175 that are associated with the displayed company and program. Although only one contact and one file are shown in FIG. 8, in other embodiments any number of contacts and files may be displayed, and the data displayed are only examples, and the invention is not so limited.

FIG. 9 depicts a block diagram of user interface my-company-information screen 900, according to an embodiment of the invention. My-company-information screen 900 allows a user or participant to manage the user's company information, which may include contact information 905, and files 910 within documents 175. My-company-information screen 900 may provide the user the ability to add, view, delete, or update the technical information within documents 175. Although two contact names and two files 910 within documents 175 are shown, any number may be present and the invention is not so limited. Further, the invention is not limited to the example data shown in FIG. 9, and any suitable data may be present. Files 910 may be displayed on a per-program basis.

Figure 10:
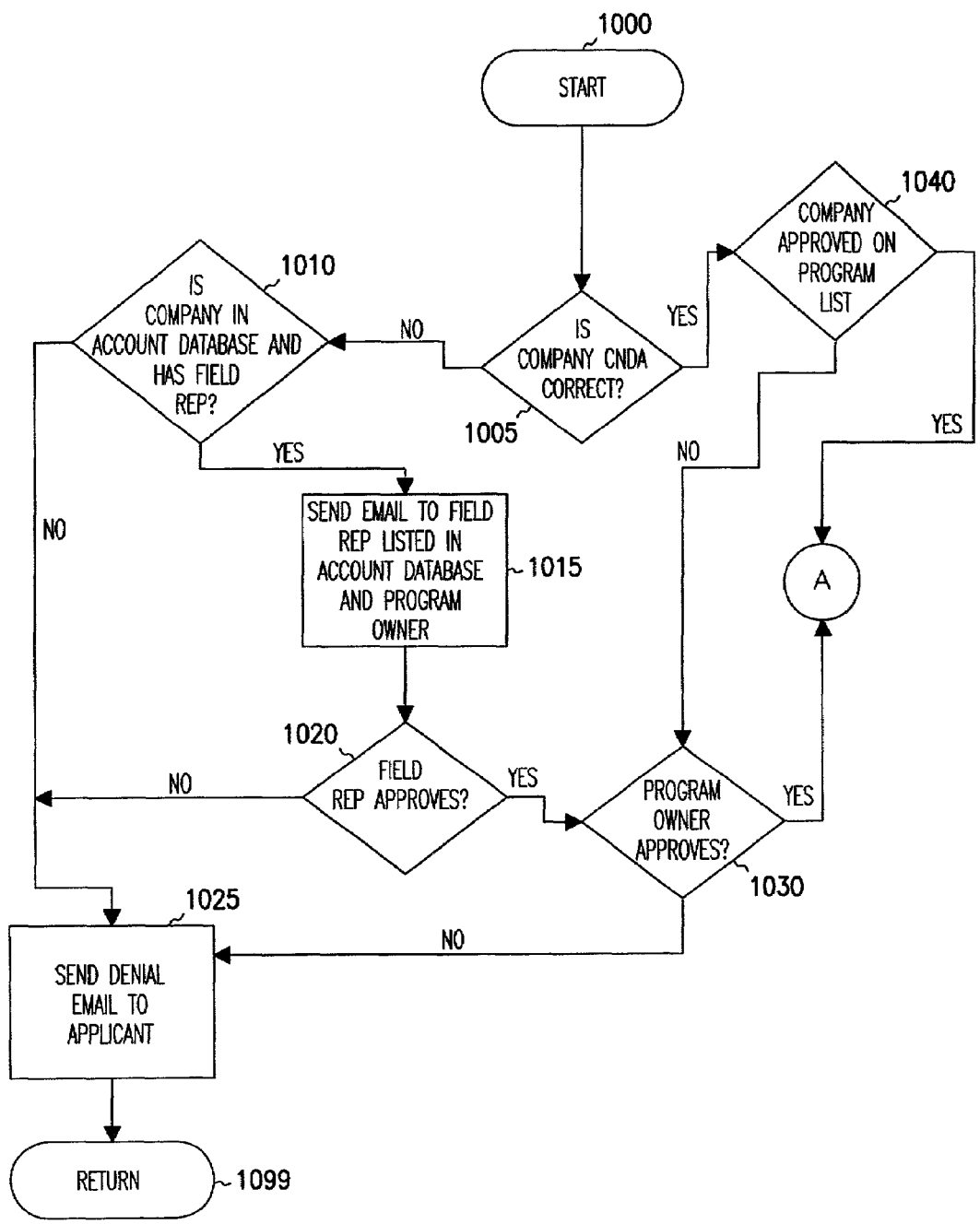
FIG. 10 depicts a flowchart of processing, according to an embodiment of the invention.

FIG. 10 depicts a flowchart of processing, according to an embodiment of the invention. Control begins at block 1000. Control then continues to block 1005 where controller 160 determines whether the non-disclosure agreement number entered in field 210 matches a non-disclosure agreement number in authorization data 170 as part of a request for access from an applicant. If the determination at block 1005 is true, then control continues to block 1040 where controller 160 determines whether the company associated with the access request is on an approved program list in authorization data 170.

Figure 11:
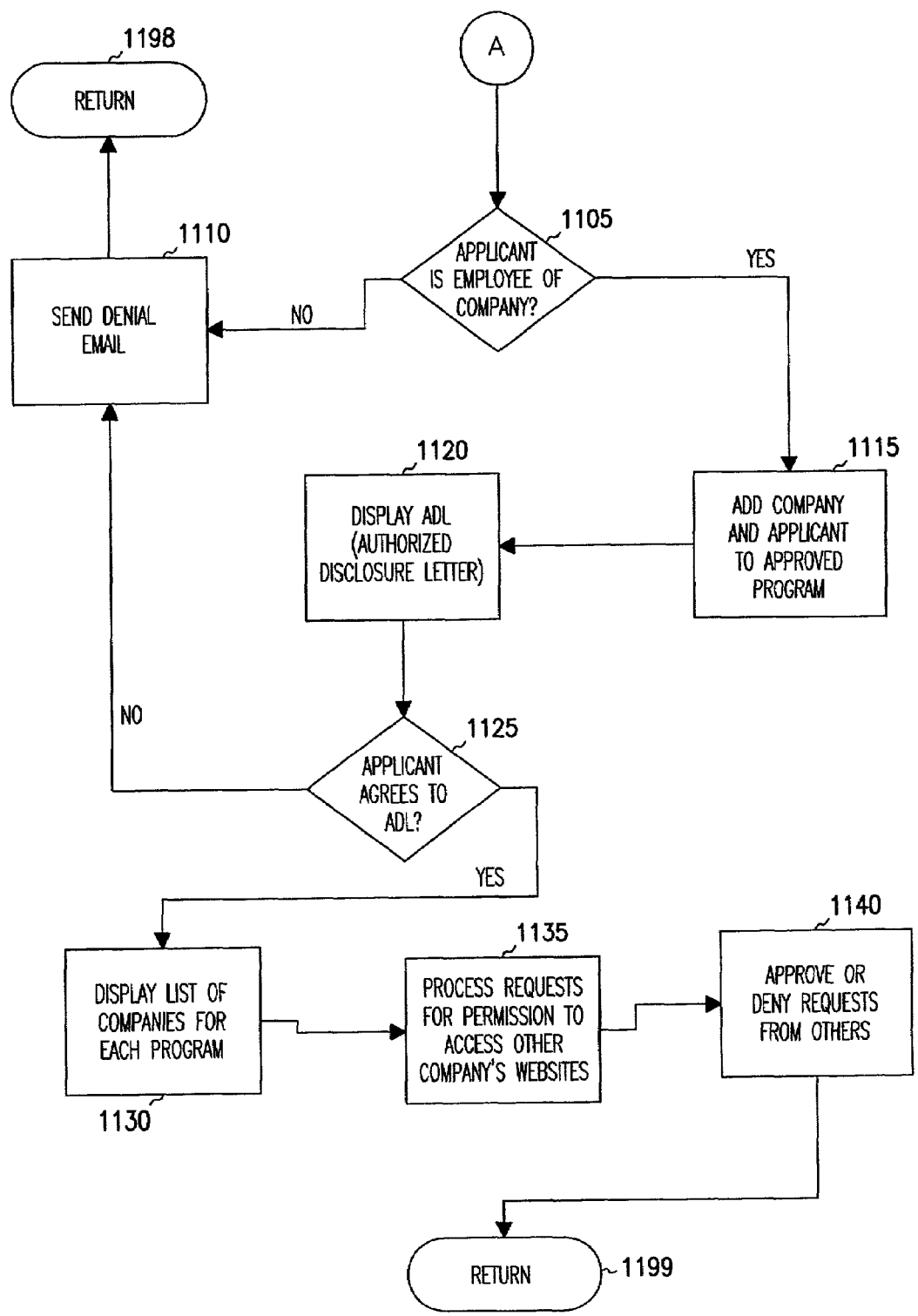
FIG. 11 depicts a flowchart of processing, according to an embodiment of the invention.

If the determination at block 1040 is true, then control continues to block 1105 in FIG. 11 where controller 160 determines whether the applicant is an employee of the associated company using authorization data 170. If the determination at block 1105 is false, then control continues to block 1110 where controller 160 sends a denial email to the applicant. Control then continues to block 1198 where the function returns.

If the determination at block 1105 is true, then control continues to block 1115 where controller 160 adds the company and the applicant to the approved program. Control then continues to block 1120 where controller 160 displays authorized disclosure letter 165 to the applicant, as previously described above with reference to FIG. 3. Referring again to FIG. 11, control then continues to block 1125 where controller 160 determines whether the applicant agreed to the terms of the ADL. If the determination at block 1125 is false, then control continues to block 1110, as previously described above.

If the determination at block 1125 is true, then control continues to block 1130 where controller 160 prepares a list of companies for each program, as previously described above with reference to FIG. 6. Referring again to FIG. 11, control then continues to block 1135 where controller 160 processes requests for permission to access information in documents 175 that belong to other companies, as previously described above with reference to FIG. 7.

Referring again to FIG. 11, control then continues to block 1140 where controller 160 processes the approval or denial of requests, as previously described above with reference to FIG. 4. Control then continues to block 1199, where the function returns.

Referring again to FIG. 10, if the determination at block 1040 is false, then control continues to block 1030 where controller 160 determines whether the program owner approves. If the determination at block 1030 is false, the control continues to block 1025 where controller 160 sends a denial email to the applicant. Control then continues to block 1099 where the function returns. If the determination at block 1030 is true, then control continues to block 1105 in FIG. 11, as previously described above.

Referring again to FIG. 10, if the determination at block 1005 is false, then control continues to block 1010 where controller 160 determines whether the company associated with the applicant is listed in an account database in authorization data 170 and has a field representative. If the determination at block 1010 is true, then control continues to block 1015 where controller 160 sends an email to the field representative and the program owner. Control then continues to block 1020 where controller 160 determines whether the field representative approves the authorization request. If the determination at block 1020 is true, then control continues to block 1030, as previously described above.

If the determination at block 1020 is false, then control continues to block 1025 where controller 160 sends a denial email to the applicant. Control then continues to block 1099 where the function returns.

If the determination at block 1010 is false, the control continues directly to block 1025, as previously described above.

What is claimed is:

1. A computer-implemented method, comprising:
   displaying an interface screen to allow an applicant from a first company to electronically enter a nondisclosure agreement number corresponding to a non-disclosure agreement;
   electronically determining whether the non-disclosure agreement number matches a non-disclosure agreement number in authorization data as part of a request for access from the applicant; if not, sending a denial email to the applicant;
   if so, electronically determining whether the first company has executed the non-disclosure agreement;
   if so, electronically determining whether the applicant is associated with the first company;
   if so, displaying an interface screen comprising terms of an authorized disclosure letter and further displaying a choice of accepting the terms or not;
   electronically determining whether the applicant agrees to the terms;
   if the applicant agrees to the terms, displaying an interface screen to allow the applicant to select one of a plurality of programs, each of which is associated with a corresponding list of company names authorized to exchange information with the applicant;
   responsive to a selection by the applicant of one of the plurality of programs, displaying the corresponding list of company names; and
   responsive to a selection by the applicant of a second company name from the list of company names, electronically providing the applicant with access to information belonging to the second company.

2. The method of claim 1, wherein the information comprises confidential information belonging to the second company.

3. The method of claim 1, further comprising:
   determining whether the first company is authorized to a program.

4. The method of claim 3, wherein the second company is authorized to the program.

5. The method of claim 3, wherein the information is associated with the program.

6. The method of claim 3, wherein the program comprises a joint-development program in which the first and second companies are participants.

7. The method of claim 1, further comprising:
   determining whether an owner of a program gives approval for the first company to participate in the program.

8. The method of claim 1, further comprising:
   determining whether a field representative gives approval for the first company to participate in a program.

9. An apparatus comprising:
   a controller;
   a display; and
   an input device;
   the controller to display an interface screen on the display to allow an applicant from a first company to electronically enter into the input device a non-disclosure agreement number corresponding to a non-disclosure agreement;
   the controller to electronically determine whether the non-disclosure agreement number matches a nondisclosure agreement number in authorization data as part of a request for access from the applicant;
   if not, the controller to send a denial email to the applicant;
   if so, the controller to electronically determine whether the first company has executed the non-disclosure agreement;
      if so, the controller to electronically determine whether the applicant is associated with the first company;
         if so, the controller to display an interface screen on the display comprising terms of an authorized disclosure letter and further to display a choice of accepting the terms or not;
   the controller to electronically determine whether the applicant agrees to the terms;
      if the applicant agrees to the terms, the controller to display an interface screen on the display to allow the applicant to electronically select one of a plurality of programs, each of which is associated with a corresponding list of company names authorized to exchange information with the applicant;
   responsive to an electronic selection by the applicant of one of the plurality of programs, the controller to display on the display the corresponding list of company names; and
   responsive to an electronic selection by the applicant of a second company name from the list of company names, the controller to provide the applicant via the display with access to information belonging to the second company.

10. The apparatus of claim 9, wherein the authorization data comprises data regarding which company names companies are authorized to the selected program.

11. The apparatus of claim 9, wherein at least one of the plurality of programs comprises a joint-development program in which the first and second companies are participants.

12. The apparatus of claim 9, wherein the information comprises confidential information belonging to the second company.

13. A signal-bearing medium comprising instructions, wherein the instructions when read and executed by a processor comprise:

displaying an interface screen to allow an applicant from a first company to electronically enter a nondisclosure agreement number corresponding to a non-disclosure agreement;

electronically determining whether the non-disclosure agreement number matches a non-disclosure agreement number in authorization data as part of a request for access from the applicant;

if not, electronically sending a denial email to the applicant;

if so, electronically determining whether the first company has executed the non-disclosure agreement;

if so, electronically determining whether the applicant is associated with the first company;

if so, displaying an interface screen comprising terms of an authorized disclosure letter and further displaying a choice of accepting the terms or not;

electronically determining whether the applicant agrees to the terms;

if the applicant agrees to the terms, displaying an interface screen to allow the applicant to select one of a plurality of programs, each of which is associated with a corresponding list of company names authorized to exchange information with the applicant;

responsive to an electronic selection by the applicant of one of the plurality of programs, displaying the corresponding list of company names; and responsive to an electronic selection by the applicant of a second company name from the list of company names, electronically providing the applicant with access to information belonging to the second company number.

14. The signal-bearing medium of claim 13, wherein the instructions further comprise:

providing an access control interface, wherein the access control interface allows the second company to control access to the information.

15. The signal-bearing medium of claim 13, wherein the instructions further comprise:

providing a request access interface, wherein the request access interface allows the applicant to request access to the information.

16. The signal-bearing medium of claim 13, wherein the instructions further comprise:

providing a display of companies who are participants in the program.

17. The signal-bearing medium of claim 13, wherein the instructions further comprise:

providing a display of companies authorized to exchange information with the applicant on a per-program basis.

18. The signal-bearing medium of claim 13, wherein the instructions further comprise:

providing a display of contact information for companies who are participants in the program.

19. The signal-bearing medium of claim 13, wherein the instructions further comprise:

managing the information.

20. The signal-bearing medium of claim 19, wherein managing the information further comprises at least one of adding, viewing, deleting, and updating the information.

21. A system server to facilitate exchange of confidential information about a plurality of controlled-communication programs, comprising:

a memory to store an authorized disclosure letter, authorization data, and a controller having a plurality of instructions;

a display;

an input device; and a processor communicatively coupled to the memory and the display, the processor to execute selected ones of the instructions to:

display an interface screen on the display to allow an applicant from a first company to enter into the input device a non-disclosure agreement number corresponding to a non-disclosure agreement;

determine whether the non-disclosure agreement number matches a nondisclosure agreement number in authorization data as part of a request for access from an applicant;

if so, determine whether the first company has executed the non-disclosure agreement;

if so, determine whether the applicant is associated with the first company;

if so, display an interface screen on the display comprising terms of an authorized disclosure letter and further displaying a choice of accepting the terms or not;

determine whether the applicant agrees to the terms, using the input device;

if the applicant agrees to the terms, display an interface screen on the display to allow the applicant to select, using the input device, one of a plurality of controlled-communication programs, each of which is associated with a corresponding list of company names authorized to exchange information with the applicant;

responsive to a selection by the applicant, using the input device, of one of the plurality of programs, display the corresponding list of company names on the display; and responsive to a selection by the applicant, using the input device, of a second company name from the list of company names, provide the applicant with access to information belonging to the second company.

* * * * *

UNITED STATES PATENT AND TRADEMARK OFFICE
CERTIFICATE OF CORRECTION

PATENT NO. : 7,539,639 B2
APPLICATION NO. : 09/978532
DATED : May 26, 2009
INVENTOR(S) : Bellantoni et al.

It is certified that error appears in the above-identified patent and that said Letters Patent is hereby corrected as shown below:

Title Page;
On the face page, in field (56), under "Other Publications", in column 2, line 10, delete ""Projected" and insert -- "Project --, therefor.

Signed and Sealed this

Fourth Day of August, 2009

JOHN DOLL
*Acting Director of the United States Patent and Trademark Office*